United States Patent
Louch et al.

(10) Patent No.: US 9,630,521 B2
(45) Date of Patent: Apr. 25, 2017

(54) VEHICLE CLIMATE CONTROL SYSTEM AND CONTROL METHOD FOR SELECTIVELY PROVIDING CABIN COOLING

(75) Inventors: Robert Jay Louch, Highland, MI (US); Donald Charles Franks, Linden, MI (US); Brian C. Moorhead, Willis, MI (US); Hasdi R. Hashim, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2318 days.

(21) Appl. No.: 12/577,942

(22) Filed: Oct. 13, 2009

(65) Prior Publication Data

US 2011/0083449 A1    Apr. 14, 2011

(51) Int. Cl.
| | |
|---|---|
| B60H 1/32 | (2006.01) |
| B60L 11/18 | (2006.01) |
| B60L 3/00 | (2006.01) |
| H01M 10/625 | (2014.01) |
| H01M 10/663 | (2014.01) |
| H01M 10/6564 | (2014.01) |
| H01M 10/613 | (2014.01) |
| B60H 1/00 | (2006.01) |
| H01M 10/63 | (2014.01) |

(52) U.S. Cl.
CPC ...... *B60L 11/1874* (2013.01); *B60H 1/00278* (2013.01); *B60L 3/0046* (2013.01); *B60L 3/0053* (2013.01); *H01M 10/613* (2015.04); *H01M 10/625* (2015.04); *H01M 10/6564* (2015.04); *H01M 10/663* (2015.04); *B60H 1/004* (2013.01); *B60H 1/00385* (2013.01); *B60H 1/00392* (2013.01); *B60L 2200/26* (2013.01); *B60L 2240/525* (2013.01); *H01M 10/63* (2015.04); *Y02T 10/7005* (2013.01); *Y02T 10/705* (2013.01); *Y02T 90/34* (2013.01)

(58) Field of Classification Search
CPC . B60H 1/00385; B60H 1/00392; B60H 1/004
USPC .................. 62/244, 259.2, 236, 243
See application file for complete search history.

(56) References Cited

U.S. PATENT DOCUMENTS

| | | | |
|---|---|---|---|
| 5,832,988 A * | 11/1998 | Mistry et al. ................. | 165/103 |
| 5,937,664 A * | 8/1999 | Matsuno et al. ............. | 62/259.2 |
| 2001/0026887 A1 | 10/2001 | Minamiura et al. | |
| 2004/0062955 A1 | 4/2004 | Kubota et al. | |
| 2007/0175230 A1 * | 8/2007 | Plummer et al. ............... | 62/236 |
| 2008/0066476 A1 * | 3/2008 | Zhu et al. ........................ | 62/133 |
| 2008/0236181 A1 * | 10/2008 | Zhu et al. ........................ | 62/239 |

* cited by examiner

*Primary Examiner* — David Teitelbaum
(74) *Attorney, Agent, or Firm* — David B. Kelley

(57) ABSTRACT

An automotive vehicle includes an air conditioning system configured to selectively cool a cabin of the vehicle and at least one electrical component of the vehicle. The vehicle also includes one or more controllers configured to determine whether the air conditioning system is operating to cool the at least one electrical component, to determine whether cabin cooling is requested, and to enable the air conditioning system to cool the cabin if the air conditioning system is operating to cool the at least one electrical component and if cabin cooling is requested.

7 Claims, 3 Drawing Sheets

VEHICLE CLIMATE CONTROL SYSTEM AND CONTROL METHOD FOR SELECTIVELY PROVIDING CABIN COOLING

BACKGROUND

Vehicle climate control systems in hybrid electric vehicles may be used to cool a vehicle battery as well as a vehicle cabin. As an example, U.S. Pat. No. 5,937,664 to Matsuno et al. discloses a vehicle battery cooling system for cooling a battery mounted in a vehicle whose vehicle compartment is air conditioned by an air conditioner. The system includes: a battery chamber for accommodating the battery; a cooling device having a cooling fan adapted to cool the battery by supplying air in the vehicle compartment to an interior of the battery chamber by the cooling fan; a cooling-air circulating device for circulating air used in cooling the battery between the battery chamber and the vehicle compartment by guiding the air into the vehicle compartment; an exhausting device for exhausting the air used in cooling the battery to outside the vehicle; a changeover device for effecting a changeover between the cooling-air circulating device and the exhausting device; a temperature detecting device for detecting at least one of a temperature of the interior of the battery chamber and a temperature of the battery; and a changeover controlling device for selecting the exhausting device by the changeover device when the temperature detected by the temperature detecting device has become greater than or equal to a predetermined value.

SUMMARY

A vehicle air conditioning system may be configured to selectively cool a cabin of the vehicle and at least one electrical component of the vehicle. One or more controllers may be configured to determine whether the air conditioning system is operating to cool the at least one electrical component, to determine whether cabin cooling is requested, and to enable the air conditioning system to cool the cabin if the air conditioning system is operating to cool the at least one electrical component and if cabin cooling is requested.

A vehicle air conditioning system may be configured to selectively cool a cabin of the vehicle and an energy storage unit configured to provide energy to move the vehicle. One or more controllers may be configured to activate at least one of an audio indicator and a visual indicator if the air conditioning system is operating to cool the energy storage unit.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Air conditioning (A/C) systems of certain hybrid electric vehicles may be used to cool high voltage batteries as well as vehicle cabins. These A/C systems may have only a single compressor. As a result, the compressor is active when the A/C system is used to cool the battery—regardless of whether the A/C system is used to cool the cabin.

A vehicle occupant unfamiliar with the A/C systems described above may turn cabin A/C cooling off in an attempt to improve fuel economy. This, however, may not prevent the compressor from activating.

Figure 1:
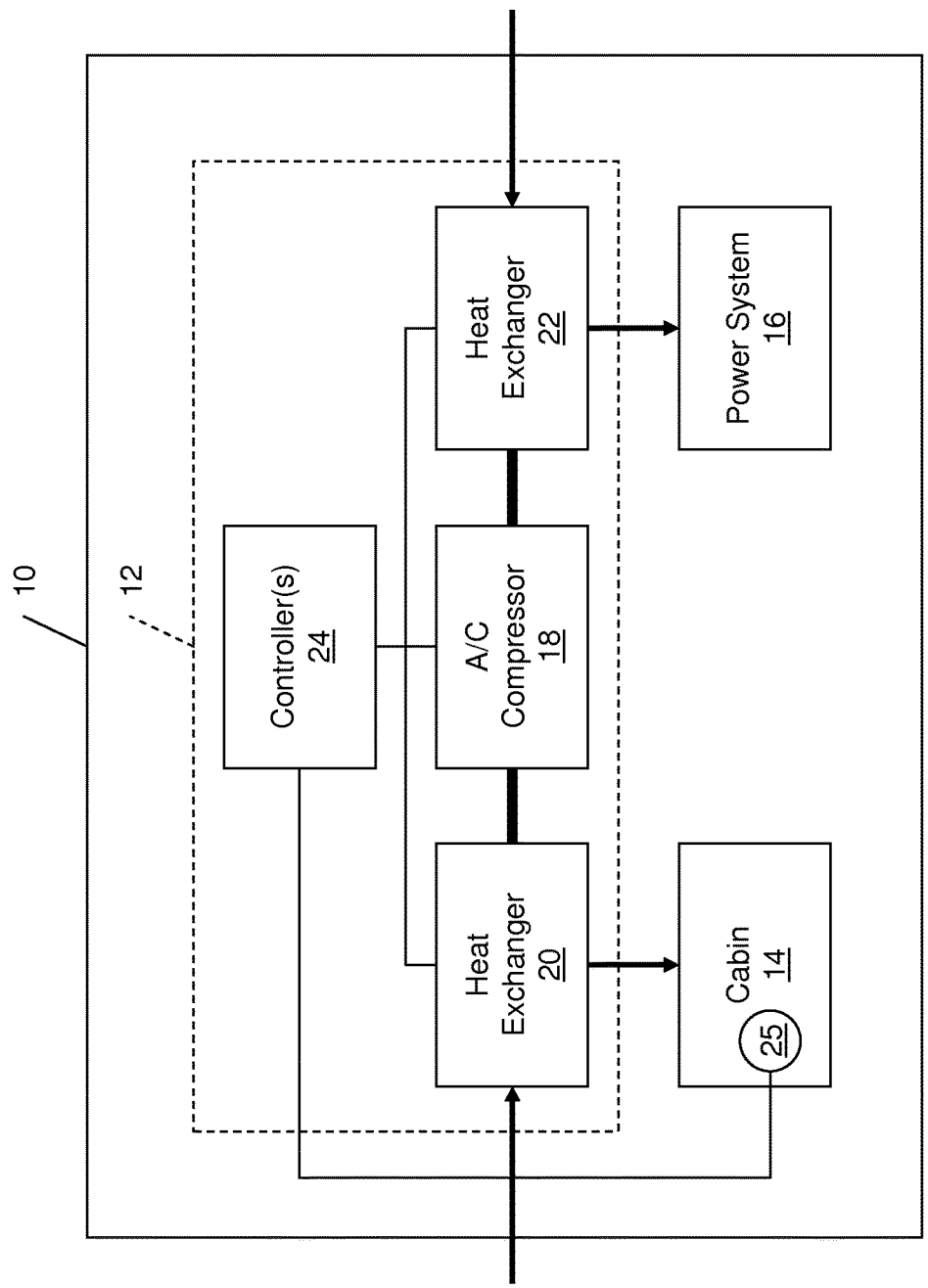
FIG. 1 is a block diagram of an embodiment of a climate control system within a vehicle.

Referring now to FIG. 1, a vehicle 10 may include a climate control system 12, cabin 14 and power system 16. In the embodiment of FIG. 1, the vehicle 10 is a hybrid electric vehicle. The power system 16 may thus include any/all of a traction battery, ultra-capacitor, power electronics, DC/DC converter, amplifiers, etc. configured, in a known fashion, to provide/deliver energy to move the vehicle 10. In other embodiments, the vehicle 10 may be a plug-in hybrid electric vehicle, battery powered vehicle, hybrid fuel cell vehicle, etc. The power system 16, in these embodiments, may include any suitable electrical components configured to provide/deliver energy to move the vehicle 10. Operation of the power system 16 may be optimal within a specified range of operating temperatures.

The climate control system 12 of FIG. 1 includes an A/C compressor 18, heat exchangers 20, 22 and controller 24. The compressor 18 and heat exchangers 20, 22 are under the command/control of the controller 24.

The climate control system 12 may provide cooling to the cabin 14 and/or power system 16. If a vehicle occupant requests cabin cooling, as described below, the controller 24 may activate the compressor 18 and heat exchanger 20 so as to provide cooling air to the cabin 14. If a temperature of the power system 16 (e.g., a battery temperature, DC/DC power converter temperature, etc.) is greater than a threshold temperature, the controller 24 may activate the compressor 18 and heat exchanger 22 so as to provide cooling air to the power system 16. The compressor 18 is thus active for either cabin cooling or power system cooling.

Temperature sensors, for example, operatively arranged in a known fashion with the power system 16 and in communication with the controller 24 may be used to detect power system temperatures.

The compressor 18 may deliver coolant (as indicated by heavy line) to the heat exchangers 20, 22 to cool air (indicated by arrow) flowing over the heat exchangers 20, 22. Air flowing over the heat exchanger 20 may be used to cool the cabin 14. Air flowing over the heat exchanger 22 may be used to cool the power system 16.

In some embodiments, coolant may flow between the compressor 18 and heat exchangers 20, 22 whether or not both are being used to cool air for the cabin 14 and power system 16 respectively. That is, if the compressor 18 is active, coolant is flowing between it and both of the heat exchangers 20, 22. In these embodiments, respective air ducts between the heat exchanger 20 and cabin 14 and the heat exchanger 22 and power system 16 may be selectively opened/closed via doors, panels, etc. within the air ducts to permit cooling air to flow to the cabin 14 and/or power system 16 as desired. In other embodiments, coolant may selectively flow between the compressor 18 and heat exchangers 20, 22. That is, if only cabin cooling is requested, coolant will only flow between the compressor 18 and heat exchanger 20. Likewise, if only power system cooling is requested, coolant will only flow between the compressor 18 and heat exchanger 22. Of course, if cabin cooling and power system cooling are requested, coolant will flow between the compressor 18 and each of the heat exchangers 20, 22. Suitable valves, for example, between the compressor 18 and heat exchangers 20, 22 may facilitate the selective flow of coolant as described above.

The controller 24 may control the doors/panels and/or valves described above to control the flow of air and/or coolant depending on the particular implementation.

An audio and/or visual indicator system 25 (e.g., display screen, speaker system, LED, etc.) may be disposed in a vicinity of the cabin 14. As explained below, the indicator system 25 may be activated when the climate control system 12 is cooling the power system 16 to inform vehicle occupants that the climate control system 12 is active (e.g., that the compressor 18 is on). The vehicle occupants may then decide whether to enable cabin cooling.

Figure 2:
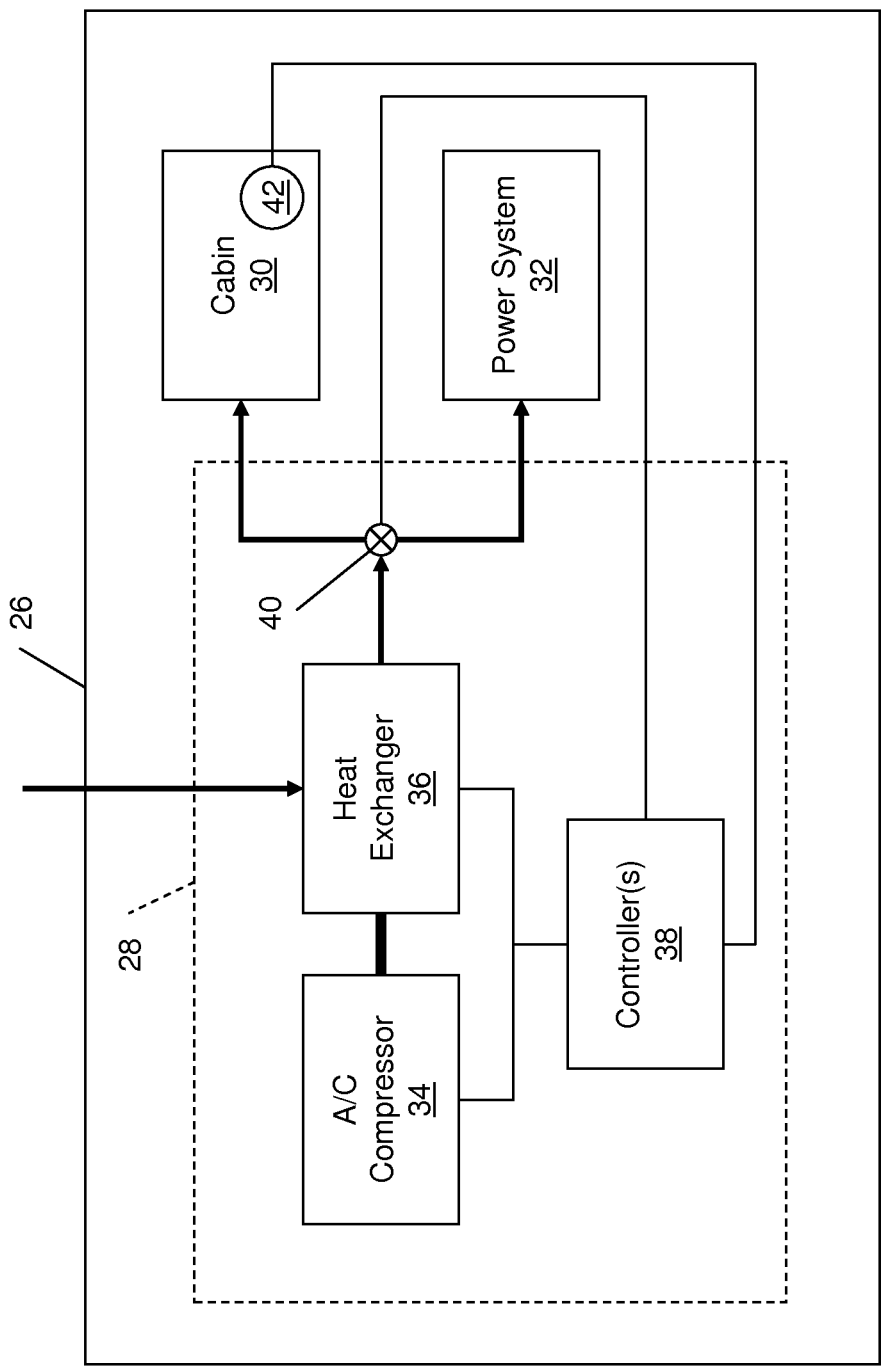
FIG. 2 is a block diagram of another embodiment of a climate control system within a vehicle.

Referring now to FIG. 2, a vehicle 26 may include a climate control system 28, cabin 30 and power system 32. As with the power system 16 illustrated in FIG. 1, the power system 32 may include a traction battery, power electronics, converters, etc. configured to provide/deliver energy to move the vehicle 26.

The climate control system 28 includes an A/C compressor 34, heat exchanger 36, controller 38 and air panel 40. The compressor 34, heat exchanger 36 and air panel 40 are under the command/control of the controller 38. The compressor 34 may deliver coolant (as indicated by heavy line) to the heat exchanger 36 to cool air (indicated by arrow) flowing over the heat exchanger 36. Air flowing over the heat exchanger 36 may be used to cool the cabin 30 and/or power system 32.

The air panel (door, vane, etc.) 40 is disposed within an air duct fluidly connecting the heat exchanger 36 with each of the cabin 30 and power system 32. The controller 24 may selectively control the position of the air panel 40 within the air duct to permit air to flow to either/both of the cabin 30 and power system 32. For example, the controller 24 may configure the air panel 40 such that cooling air may flow only to the cabin 30 (closing off the ducts to the power system 32). Similarly, the controller 24 may configure the air panel 40 such that cooling air may flow only to the power system 32 (closing off the ducts to the cabin 30). Of course, the controller 24 may also configure the air panel 40 such that cooling air may flow to both of the cabin 30 and power system 32 (opening the ducts to both the cabin 30 and power system 32).

An audio and/or visual indicator system 42 (e.g., display screen, speaker system, LED, etc.) may be disposed in a vicinity of the cabin 30. As with the indicator system 25 illustrated in FIG. 1, the indicator system 42 may be activated when the climate control system 28 is cooling the power system 32.

As mentioned above, a vehicle occupant may turn off cabin cooling in an attempt to improve fuel economy. As apparent from the discussion regarding the climate control systems 12, 28 illustrated in FIGS. 1 and 2 respectively, this will not necessarily prevent the compressors 18, 34 from activating when the power systems 16, 32 request cooling. Alerting vehicle occupants that the climate control system is active (i.e., that the climate control system is cooling the power system) may allow them to take advantage of this activity to also cool the cabin.

Figure 3:
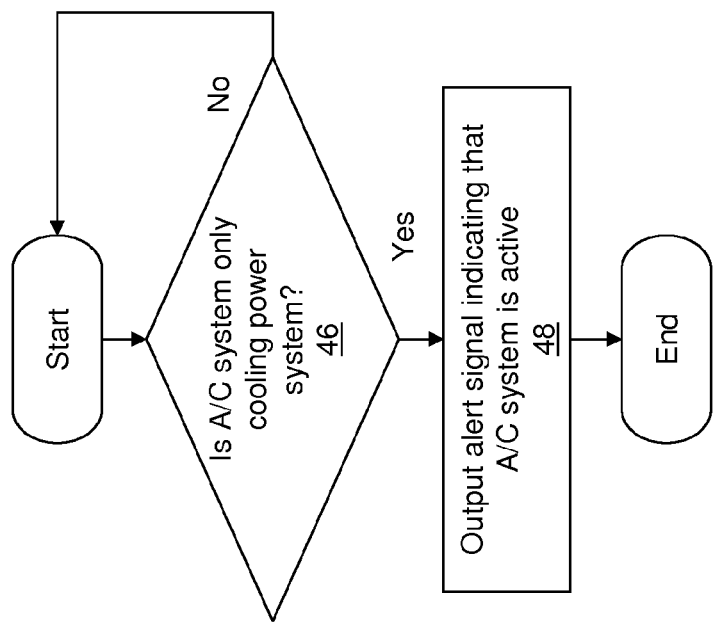
FIG. 3 is a flow chart depicting an example control algorithm for a climate control system.

Referring now to FIGS. 1, 2 and 3, it is determined whether an A/C system is only cooling a power system at operation 46. For example, the controller 24 may determine, in a known fashion, whether the climate control system 12 is operating to cool only the power system 16. If no, the algorithm may continue to wait. That is, if the climate control system 12 is off or cooling both the cabin 14 and power system 16, the algorithm may continue to wait.

If the A/C system is operating to cool the power system, an alert signal indicating that the A/C system is active may be output at operation 48. For example, the controller 38 may send information to be displayed and/or played by the audio and/or visual indicator 42 (a flashing light, a specified tone, an alert message, etc.) indicating that the climate control system 28 is active. A vehicle occupant may then decide whether to request cabin cooling, which may have minimal impact on fuel economy.

Alternatively, the above decision as to whether to request cabin cooling when power system cooling is occurring may be automated.

Figure 4:
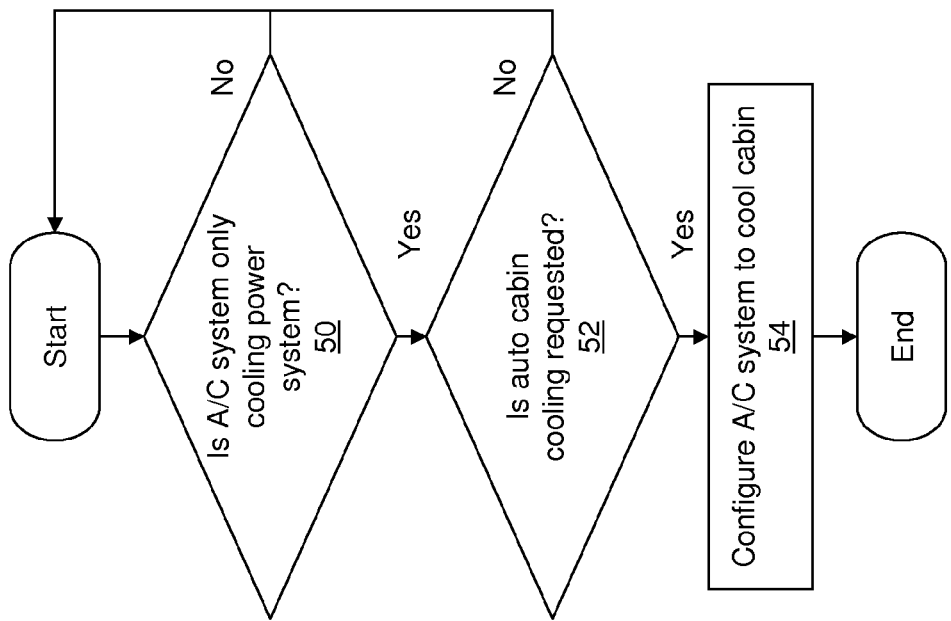
FIG. 4 is a flow chart depicting another example control algorithm for a climate control system.

Referring now to FIGS. 1, 2 and 4, it is determined whether an A/C system is only cooling a power system at operation 50. If no, the algorithm may continue to wait.

If the A/C system is operating to cool the power system, it is determined, in a known fashion, whether automatic cabin cooling is requested at operation 52. A vehicle occupant may, for example, select automatic cooling via a dial setting, input screen, etc. This setting is for circumstances where the vehicle occupant only wants cabin cooling when the climate control system is already operating to cool the power system (traction battery, DC/DC controller, etc.) If no, the algorithm may continue to wait.

If automatic cabin cooling is requested, the A/C system may be configured to cool the cabin at operation 54. In certain embodiments, the controller 24 may activate suitable valves disposed within coolant lines between the compressor 18 and heat exchanger 20 such that coolant flows between them, and activate suitable fans to direct air over the heat exchanger 20 and to the cabin 14. Alternatively, the controller 24 may activate suitable fans to direct air over the heat exchanger 20 and to the cabin 14 (assuming coolant flows between the heat exchanger 20 and compressor 18 whenever the compressor 18 is active). In other embodiments, the controller 38 may position the air panel 40 such that cooling air flows to both the cabin 30 and power system 32 as opposed to just the power system 32. Other arrangements and scenarios are also possible.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:
1. A vehicle comprising: a cabin;
an electrical component;
an air conditioning system configured to selectively cool the electrical component or both of the cabin and the electrical component; and at least one controller configured to, in response to a request for cabin cooling, enable the air conditioning system to cool the cabin only if the air conditioning system is already operating to cool the electrical component.

2. The vehicle of claim 1 wherein the air conditioning system includes a single air conditioning compressor and a heat exchanger in fluid communication with the air conditioning compressor, the cabin and the electrical component.

3. The vehicle of claim 1 wherein the air conditioning system includes a single air conditioning compressor, a first heat exchanger in fluid communication with the air conditioning compressor and the cabin, and a second heat exchanger in fluid communication with the air conditioning compressor and the electrical component.

4. The vehicle of claim 1 wherein the electrical component is an energy storage unit.

5. The vehicle of claim 1 further comprising at least one of an audio indicator and a visual indicator, wherein the at least one controller is further configured to activate the at least one of the audio indicator and the visual indicator if the air conditioning system is operating to cool the electrical component.

6. The vehicle of claim 5 wherein the visual indicator includes a light source.

7. The vehicle of claim 5 wherein the audio indicator includes a speaker.

* * * * *